United States Patent
Barrera Torres et al.

(10) Patent No.: US 9,994,165 B1
(45) Date of Patent: Jun. 12, 2018

(54) SYSTEM AND METHOD FOR DELAYING VEHICLE INTERIOR DOOR TRIM DISENGAGEMENT FROM DOOR SHEET METAL DURING SIDE IMPACT

(71) Applicant: GM Global Technology Operations LLC, Detroit, MI (US)

(72) Inventors: Alejandro Barrera Torres, Metepec (MX); Jesus Edgar E. Dominguez Cuevas, Jiutepec (MX)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days. days.

(21) Appl. No.: 15/405,825

(22) Filed: Jan. 13, 2017

(51) Int. Cl.
  *B60R 13/02* (2006.01)
  *B60J 5/04* (2006.01)

(52) U.S. Cl.
  CPC ......... *B60R 13/0206* (2013.01); *B60J 5/0411* (2013.01); *B60J 5/0469* (2013.01); *B60R 13/0243* (2013.01)

(58) Field of Classification Search
  CPC .. B60R 13/0206; B60R 13/0243; B60J 5/049; B60J 5/0411
  USPC ....................................................... 296/146.7
  See application file for complete search history.

(56) References Cited

U.S. PATENT DOCUMENTS

| | | | | |
|---|---|---|---|---|
| 6,095,594 A * | 8/2000 | Riddle | ................ | B60R 13/0206 24/297 |
| 6,412,852 B1 * | 7/2002 | Koa | .................... | B60R 13/0206 296/146.5 |
| 2005/0206192 A1 * | 9/2005 | Dry | ........................ | B60J 5/0468 296/146.7 |
| 2013/0181475 A1 * | 7/2013 | Torii | ..................... | B60J 5/0413 296/146.7 |
| 2015/0093177 A1 * | 4/2015 | Morris | .................... | F16B 5/065 403/13 |
| 2015/0375692 A1 * | 12/2015 | Migaki | ............... | B60R 13/0206 296/1.08 |
| 2016/0001714 A1 * | 1/2016 | Migaki | ............... | B60R 13/0237 296/193.05 |
| 2016/0121810 A1 * | 5/2016 | Stanczak | ............. | B60R 13/0206 296/1.08 |

* cited by examiner

Primary Examiner — Jason S Morrow

(57) ABSTRACT

A vehicle door has a metal door frame having at least one opening, a decorative interior door panel, and at least one post projecting outwardly from an inner side of the decorative interior door panel. The post may have a length, cross sectional shape and cross sectional dimensions to engage within the opening when the decorative interior door panel is secured to the metal door frame. The post and the opening may cooperate to delay separation and movement of the decorative interior door panel upwardly and away from the metal door frame during a side impact crash on the vehicle door.

16 Claims, 2 Drawing Sheets

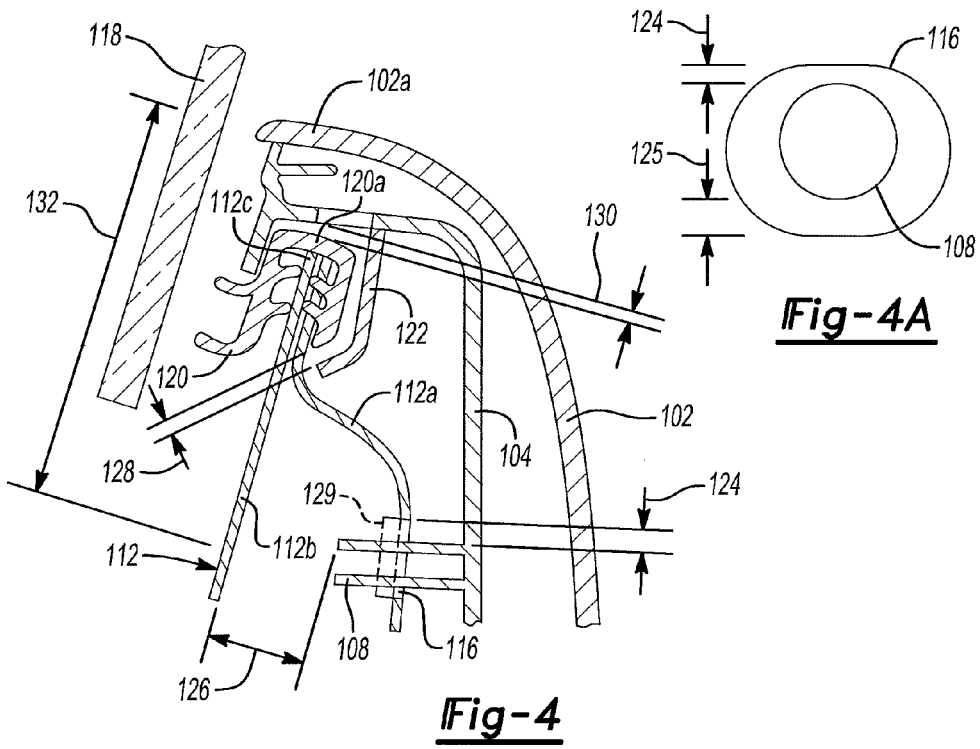
Fig-4A
Fig-4
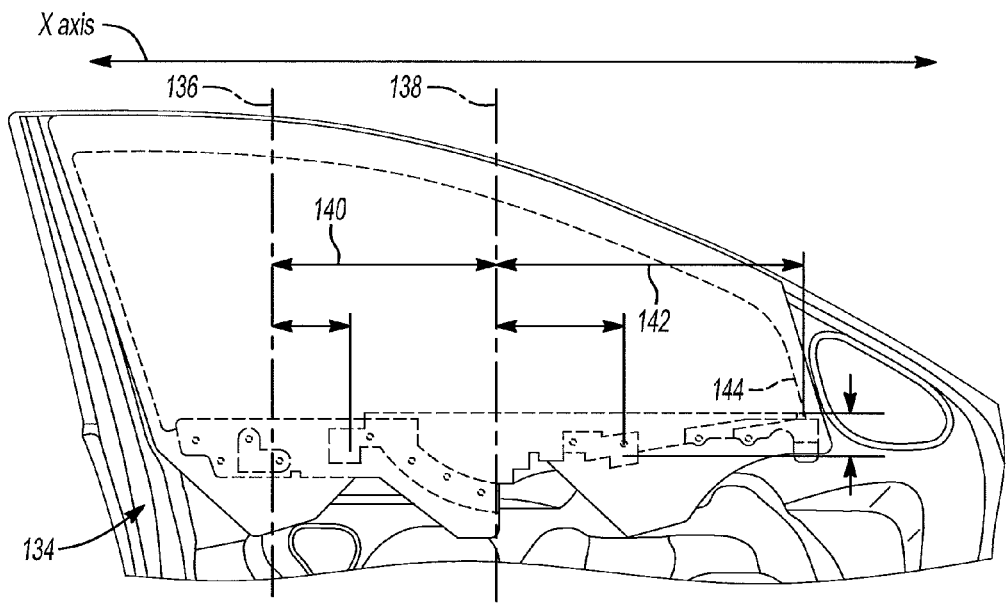
Fig-5

SYSTEM AND METHOD FOR DELAYING VEHICLE INTERIOR DOOR TRIM DISENGAGEMENT FROM DOOR SHEET METAL DURING SIDE IMPACT

FIELD

The present disclosure relates to doors for motor vehicles such as passenger cars and trucks, and more particularly to a system and method for delaying separation of an interior door trim panel from a metal door frame component during a side impact crash event.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Passenger cars and trucks typically incorporate a side impact air bag (SIAB) module. During a side impact crash event involving a passenger car or truck having a SIAB module, it is important for interior trim components, such as the interior door trim panel, not to begin disengaging from the metal door frame to which it is mounted immediately upon the beginning stage of the side impact crash event, or in other words within the first few milliseconds of the start of the side impact crash event. Rather, it is important for the interior door trim panel to remain attached to the metal door frame for some definite time period after the start of a side impact crash event so that disengagement of the interior door trim panel does not defect deployment of the SIAB module. This is because during some types of side impact crash events, there may be a tendency for a conventionally secured interior door trim panel to virtually immediately detach and begin moving upwardly (i.e., in the +Z direction) toward the vehicle roof. With this upward movement brings the risk of the interior door trim panel interfering with proper deployment of the SIAB module, which is mounted adjacent to the vehicle roof above the door.

The ability of the interior vehicle door trim panel to remain secured to the metal door frame for a time after the full deployment of the SIAB module when experiencing the onset of a side impact crash event, may also be important for successfully completing specific types of vehicle crash tests performed by various governmental testing agencies on new cars and trucks. Such governmental agencies may include, for example, the European New Car Assessment Program (NCAP) "Pole Impact" test, and/or ECE (Economic Commission for Europe) "R95" moving barrier test, and possibly one or more tests performed by the U.S. National Highway Safety Transportation Association (NHTSA) on new cars and trucks.

In one solution for ensuring that the interior door trim panel stays secured to the metal door frame, high strength BB-style threaded fasteners may be used to secure an interior plastic door panel. An associated metal clip may also be required to be secured to a door inner metal of the door frame, in order to secure a portion of the interior door trim panel to the door inner metal using the BB-style threaded fastener.

As will be appreciated, then, there is a strong interest in simplifying the attachment of the interior door panel to a door inner metal portion of a vehicle door in a manner which prevents upward movement of the interior door panel during a side impact crash, but which still forms a cost effective approach for securing the interior door panel.

SUMMARY

In one aspect the present disclosure relates to a vehicle door comprising a metal door frame having at least one opening, a decorative interior door panel, and at least one post projecting outwardly from an inner side of the decorative interior door panel. The at least one post may have a length, cross sectional shape and cross sectional dimensions to engage within the at least one opening when the decorative interior door panel is secured to the metal door frame. The at least one post and the at least one opening may cooperate to delay separation and movement of the decorative interior door panel upwardly and away from the metal door frame during a side impact crash on the vehicle door.

In another aspect the present disclosure relates to a vehicle door comprising a metal door frame having first and second spaced apart openings, a decorative interior door panel, and a belt bracket secured to an inner surface of the decorative interior door panel adjacent an upper edge of the decorative interior door panel. The belt bracket may include first and second posts laterally spaced apart from one another and projecting outwardly from the belt bracket. The first and second posts may each have a length and cross sectional shape enabling each post to engage within a respective one of the openings when the decorative interior door panel is secured to the metal door frame. The first and second posts and the first and second openings may cooperate to delay separation and movement of the decorative interior door panel upwardly and away from the metal door frame during a side impact crash on the vehicle door.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a simplified side cross sectional view illustrating examples of clearances between one of the posts shown in FIG. 2 and various other portions of the vehicle metal door frame and its associated components;

FIG. 4A is a simplified diagram further illustrating one example of clearances that may be provided between the post and the upper and lower edges of the slot engaging the post; and FIG. 5 is a simplified plan view of an inside of a portion of a vehicle door illustrating example ranges of locations where a pair of the posts, such as shown in FIG. 1, may be located along the horizontal length of the door.

In the drawings, it will be appreciated that reference numbers may be reused to identify similar and/or identical elements.

DETAILED DESCRIPTION

Figure 1:
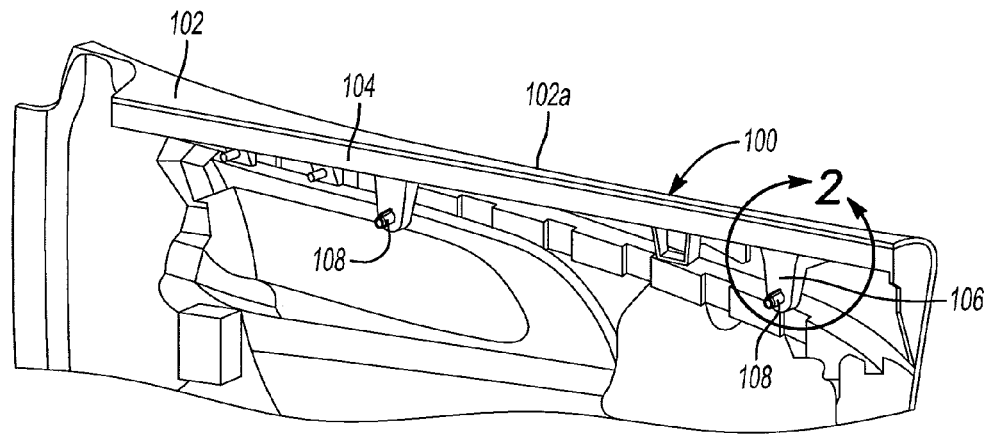
FIG. 1 is a view of one embodiment of a portion of an interior door panel in accordance with the present disclosure illustrating one embodiment in which a pair of projecting posts are supported from a belt bracket, and where the belt bracket is in turn supported from an interior door panel, and where the posts help to delay separation of the interior door panel during a side impact crash event.

Referring to FIG. 1 there is shown a portion of an interior door panel assembly 100 having a decorative interior panel 102. In this example a belt bracket 104 is fixedly secured to an inner surface of the interior panel 102 adjacent an upper edge portion 102a of the interior panel. In this example the belt bracket 104 forms an independent component, for example made from a high strength plastic, which may be secured in any suitable fashion, for example by using threaded fasteners (not shown) to the interior panel 102.

The belt bracket 104 in this example includes two depending arms 106 that each include a projecting post 108 which projects generally perpendicularly from its associated depending arm. Optionally, the belt bracket 104 may be eliminated and the projecting posts 108 formed or otherwise secured directly to an inside surface of the interior panel 102. Both embodiments are contemplated by the present disclosure.

Figure 2:
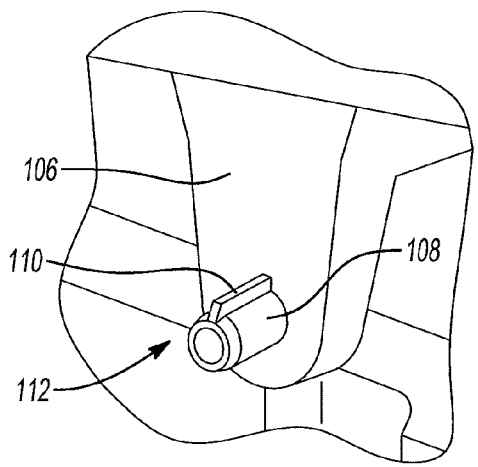
FIG. 2 is an enlarged perspective illustration of one of the posts shown in FIG. 1.

One of the arms 106 and its associated post 108 is shown in greater detail in FIG. 2. From FIG. 2 it can be seen that the post 108 may include at least one radially extending rib 110 with a tapered edge 112 to aid insertion into a hole. The rib 110 is optional, but does serve to significantly strengthen the post 108. While two posts 108 are shown in FIG. 1, additional or fewer posts 108 may be used. It is anticipated, however, that the use of two posts will be adequate to sufficiently delay the onset of upward movement of the door panel 100 for a time sufficient to allow full deployment of the SIAB module during a side impact crash test such as a (NCAP) "Pole Impact" test, and/or ECE (Economic Commission for Europe) "R95" moving barrier test. It will also be appreciated that while the posts 108 have been shown as being integrally formed on the belt bracket 104, as noted above, the posts could be formed directly on an inner surface the interior panel 102, therefore eliminating the belt bracket.

The posts 108 in the example embodiment shown in FIG. 1 are shown as being laterally spaced apart from one another and generally substantially aligned along a horizontal axis. However, the spacing of the posts 108 may be varied, and one of the posts may be positioned above the other, if necessary, to optimize performance of the posts 108 in delaying the separation of the interior panel 102 from the door frame to which the interior door panel assembly 100 is mounted during deployment of the SIAB module.

Figure 3:
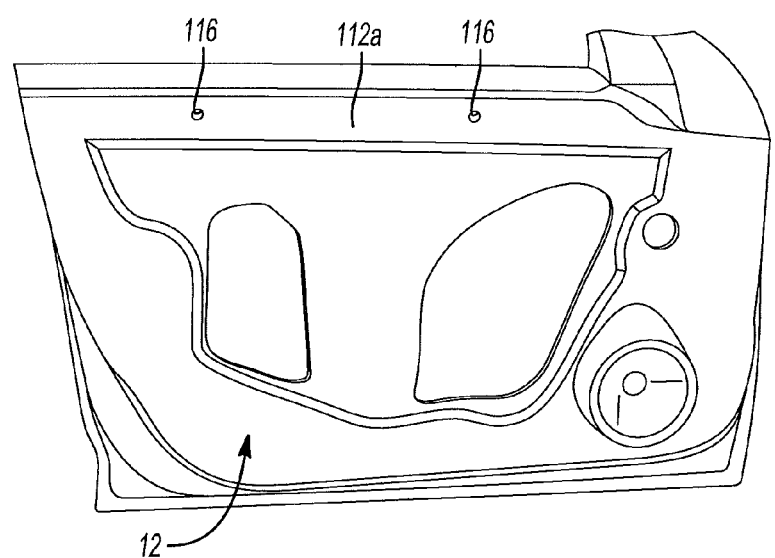
FIG. 3 is a perspective illustration of an inner door metal of a metal door frame of a vehicle door illustrating one example of locations of the slots.

FIG. 3 illustrates one example of a door frame 112 to which the interior panel 102 may be mounted. The door frame 112 may be made from metal, and may have an inner metal 112a with two slots 116 formed therein. The slots 116 may be used to receive the posts 108 (FIGS. 1 and 2). When the posts 108 are engaged in the slots 116, this forms an effective configuration for limiting upward movement of the interior door panel 100 during a side impact crash test.

Referring to FIG. 4, various examples of clearances between portions of the interior door panel assembly 100 and other components of a vehicle door are shown. The door frame 112 includes an outer metal 112b. A window 118 is positioned adjacent to a seal 120, and the seal 120 is positioned over an upper fold 112c of the door frame 112. With reference to FIGS. 4 and 4A, a gap of about 1.5 mm, indicated by dimensional arrows 124, may exist between an upper edge of the post 108 and the upper edge of the slot 116. FIG. 4A illustrates that a greater gap, for example about 4 mm, may exist between the bottom of the post 108 and a lower edge of the slot 116, as indicated by dimensional arrows 125. A gap of about 6.0 mm, as indicated by arrow 126 in FIG. 4, may exist between the post 108 and the outer metal 112b of the door frame 112. A gap of about 3.0 mm, as indicated by arrows 128, may exist between a distal inwardly turned end 122 of the belt bracket 104 and the seal 120. A gap of about 2.8 mm, as indicated by arrows 130, may exist between an inside surface of the belt bracket 104 and a top portion 120a of the seal 120. The distance from a center of the post 108 to an upper edge 102a of the door panel 102 may be about 55 mm, as indicated by arrow 132. While specific clearances are described herein, specific implementations of the interior door panel assembly 100 may use different clearances. Optionally, a foam seal 129 may be included to seal the slot 116.

The diameter and cross sectional shape of the posts 108 may also vary to meet the needs of a specific application, but in one example the posts are each circular in shape and each has a diameter of about 10 mm. The rib 110 on each post 108 may also vary in length, but in one example it extends about 1 mm radially out from the post 108. Each post 108 may vary in overall length but in one example each post 108 has a length of between about 15 mm-30 mm. And while the posts 108 are shown as being straight, for some applications it may be preferred to form the posts with a slightly arcuate shape or other non-linear shape.

Referring to FIG. 5, one example of where the posts 108 may be located to optimize performance during the NCAP Pole Impact Test is shown. Initially it will be appreciated that the $50^{th}$ percentile Male Pole "touch point", indicated by vertical dashed line 136, on a vehicle door 134, and a $5^{th}$ percentile touch point, indicated by dashed line 138, on the same vehicle door 134, may be determined. These two touch points may be located in relation to the front seats (i.e., along the X axis) and the vehicle door 134.

The slot 116 where the most rearward post 108 is anchored may preferably be located about 10% to about 30% of a distance represented by arrow 140. The distance represented by arrow 140 is that distance between where the approximate centerlines of the $50^{th}$ percentile male and $5^{th}$ percentile female touch points are. The other slot 116, which forms the forward most anchor point for the door panel 100, may be located from between about 10% to about 30% of the distance, represented by arrow 142, from a projected centerline of the $5^{th}$ percentile female touch point, and a window frame forward edge 144 point. In the event of any interference with other elements of the door 134, it may be preferable to shift the above described ranges 140 and/or 142 rearwardly (i.e., away from window frame forward edge 144) as necessary to resolve the interference. The precise locations of the slots 116 may be further tuned subsequent to crash testing.

The posts 108 and slots 116 operate to delay separation of the door panel 100 from the inner metal 112a during side impact crash testing for at least about 20 ms, and more typically at least about 30 ms from the onset of a side impact crash event. This ensures that separation of the door panel 100 will not interfere with deployment of the SIAB module when the vehicle door 134 experiences a side impact crash event. The posts 108 and the slots 116 can be integrated into components of the vehicle door 134 with little additional cost, and without significantly complicating the manufacture and assembly of the vehicle door, and further without adding tangible weight to the vehicle door.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A vehicle door comprising:
   a metal door frame having at least one opening;
   a decorative interior door panel;
   at least one post projecting outwardly from an inner side of the decorative interior door panel, the at least one post having a length, cross sectional shape and cross sectional dimensions to engage within the at least one opening when the decorative interior door panel is secured to the metal door frame; and
   the at least one post and the at least one opening cooperating to delay separation and movement of the decorative interior door panel upwardly and away from the metal door frame by a predetermined amount of time to allow deployment of a side impact air bag module during a side impact crash on the vehicle door.

2. The vehicle door of claim 1, wherein the decorative interior door panel includes a fixedly attached belt bracket, and wherein the at least one post is located on the belt bracket.

3. The vehicle door of claim 1, wherein the at least one post is located adjacent an upper edge portion of the decorative interior door panel.

4. The vehicle door of claim 1, further comprising an additional post projecting outwardly from the inner side of the decorative interior door panel, and an additional opening formed on the metal door frame for accepting the additional post therein.

5. The vehicle door of claim 2, further comprising a depending arm portion extending from the belt bracket toward the metal door frame, and wherein the at least one post extends from the depending arm portion.

6. The vehicle door of claim 1, wherein the post includes a radially extending rib for enhancing the strength of the at least one post.

7. The vehicle door of claim 1, wherein the at least one opening forms a slot, and wherein the at least one post is dimensioned to provide a first clearance between an upper edge of the slot and the at least one post, and a second clearance between a lower edge of the post and a lower edge of the slot.

8. The vehicle door of claim 7, wherein the first clearance comprises about 1.5 mm and the second clearance comprises about 4.0 mm.

9. The vehicle door of claim 1, wherein the at least one post comprises a diameter of about 10 mm.

10. The vehicle door of claim 4, wherein the at least one post and the additional post operate to delay separation of the decorative interior door panel from the metal door frame for a time interval of at least about 20 ms upon the vehicle door experiencing a side impact crash.

11. A vehicle door comprising:
    a metal door frame having first and second spaced apart openings;
    a decorative interior door panel;
    a belt bracket secured to an inner surface of the decorative interior door panel adjacent an upper edge of the decorative interior door panel;
    the belt bracket including first and second posts laterally spaced apart from one another and projecting outwardly from the belt bracket, the first and second posts each having a length and cross sectional shape enabling each of the first and second posts to engage within a respective one of the first and second spaced apart openings when the decorative interior door panel is secured to the metal door frame; and
    the first and second posts and the first and second spaced apart openings cooperating to delay separation and movement of the decorative interior door panel upwardly and away from the metal door frame by a predetermined amount of time to allow deployment of a side impact air bag module during a side impact crash on the vehicle door.

12. The vehicle door of claim 11, wherein the first and second posts have a circular shape.

13. The vehicle door of claim 11, wherein each of the first and second posts has a radially extending rib to provide additional strength to the posts.

14. The vehicle door of claim 11, wherein the first and second spaced apart openings form slots.

15. The vehicle door of claim 11, wherein each of the first and second posts has a radially extending rib, wherein the first and second spaced apart openings form slots, and wherein the radially extending rib of each of the first and second posts has a clearance from an upper edge of a respective one of the slots of about 1.5 mm and a clearance from a lower edge of the respective one of the slots of about 4 mm.

16. The vehicle door of claim 11, wherein the first and second posts and the first and second spaced apart openings cooperate to delay separation of the decorative interior door panel from the metal door frame by at least about 20 ms from an onset of a side impact crash impacting the vehicle door.

\* \* \* \* \*